United States Patent
Gill et al.

(10) Patent No.: US 12,463,909 B2
(45) Date of Patent: Nov. 4, 2025

(54) SYSTEMS AND METHODS FOR NETWORKED MICROSERVICES FLOW CONTROL

(71) Applicant: CodeRabbit Inc., Walnut Creek, CA (US)

(72) Inventors: Tanveer Gill, Walnut Creek, CA (US); Harjot Gill, Walnut Creek, CA (US); Michał Krasnoborski, Gdynia (PL); Krzysztof Kwapisiewicz, Gdańsk (PL); Daria Bialobrzeska, Płock (PL); Hasit Mistry, Milpitas, CA (US); Jai Desai, Pleasanton, CA (US)

(73) Assignee: CodeRabbit Inc., Walnut Creek, CA (US)

( * ) Notice: Subject to any disclaimer, the term of this patent is extended or adjusted under 35 U.S.C. 154(b) by 328 days.

(21) Appl. No.: 18/364,917

(22) Filed: Aug. 3, 2023

(65) Prior Publication Data
US 2024/0048495 A1 Feb. 8, 2024

Related U.S. Application Data

(63) Continuation of application No. PCT/US2023/071550, filed on Aug. 2, 2023.

(60) Provisional application No. 63/370,351, filed on Aug. 3, 2022.

(51) Int. Cl.
*H04L 47/2441* (2022.01)
*H04L 47/20* (2022.01)
*H04L 67/51* (2022.01)

(52) U.S. Cl.
CPC .......... *H04L 47/2441* (2013.01); *H04L 47/20* (2013.01); *H04L 67/51* (2022.05)

(58) Field of Classification Search
CPC ...... H04L 47/2441; H04L 47/20; H04L 67/51
See application file for complete search history.

(56) References Cited

U.S. PATENT DOCUMENTS

| | | | |
|---|---|---|---|
| 7,644,150 B1 * | 1/2010 | Nucci | H04L 41/16 709/204 |
| 9,716,617 B1 * | 7/2017 | Ahuja | H04L 41/0816 |
| 10,084,600 B1 | 9/2018 | Irwan et al. | |
| 10,375,090 B2 * | 8/2019 | McGrew | H04L 47/2441 |
| 2005/0102414 A1 * | 5/2005 | Hares | H04L 45/00 709/232 |
| 2016/0094480 A1 * | 3/2016 | Kulkarni | H04L 47/805 370/230 |
| 2020/0007405 A1 * | 1/2020 | Chitalia | H04L 41/14 |
| 2024/0048495 A1 * | 2/2024 | Gill | H04L 47/20 |

OTHER PUBLICATIONS

PCT/US2023/071550 International Search Report and Written Opinion dated Nov. 21, 2023.

* cited by examiner

*Primary Examiner* — Afshawn M Towfighi
(74) *Attorney, Agent, or Firm* — Wilson Sonsini Goodrich & Rosati

(57) ABSTRACT

Described are platforms, systems, media, and methods for performing flow control as a service in a networked microservice-based application comprising an aperture controller comprising a circuit architecture configuration user interface and a policy control loop and a plurality of aperture agents, each aperture agent comprising a metrics service, a flow classification service, and a flow control service.

14 Claims, 8 Drawing Sheets

SYSTEMS AND METHODS FOR NETWORKED MICROSERVICES FLOW CONTROL

CROSS-REFERENCE TO RELATED APPLICATIONS

This application is a continuation of International Application No. PCT/US2023/071550, filed Aug. 2, 2023, which claims the benefit of U.S. Provisional Application No. 63/370,351, filed on Aug. 3, 2022, each of which are incorporated by reference in their entirety.

BACKGROUND

Microservices architecture revolutionized an industry previously driven by the limited pipelines leveraged in monolithic applications. The power to build large applications using several small, separated, and independent segments, each with a unique purpose, made microservices a key element in accelerating and customizing design and deployment.

SUMMARY

We disclose an innovative method to perform "Flow Control as a Service" for modern cloud applications, notably in web-scale applications. The disclosed adaptive flow control policies for APIs and application features are orders-of-magnitude more effective in preventing cascading failures and ensuring a consistent end-user experience than traditional workflows and tools. Our flow control policies include capabilities such as distributed rate limiting (for abuse prevention) and concurrency limiting (for service protection) to prevent cascading failures. The limits are applied to the API traffic or features in the code to gracefully degrade the service in overload scenarios and user abuse.

Customers who are in the middle of transitioning from a monolithic architecture to microservices architecture do run into latency issues. As some data is accessed via API for microservices architecture and other sets are coming directly from a monolithic data structure.

Modern cloud applications based on microservices are characterized by multi-level architectures and deployments. FIG. 1 illustrates a fictitious e-commerce application that takes orders from customers, verifies inventory and available credit, and ships them. The application consists of several components including the Storefront user interface, along with some backend services for checking credit, maintaining inventory, and shipping orders. The application consists of a set of dependent services.

As shown in FIG. 1, a number of instances may be collectively configured to provide a Representational State Transfer (REST) service for an item list in inventory service. Each resource is identified by one or more Uniform Resource Identifiers (URIs). To access the resource, an application may call a Hypertext Transfer Protocol (HTTP) operation on one of the resource's URIs. In the example shown in FIG. 1, multiple instances may be configured to service the same REST URI and as illustrated, may be grouped to form "inventory service."

The distributed structure of microservice-based systems increases complexity in testing, monitoring, and debugging each segment of the application. Due to this complexity, some of the scenarios might not be tested end-to-end, leading to cascading faults and failures to arise. As the adoption of such applications grows, the largest obstacle, and one frequently encountered, is "service overloading." The upside of adoption and scale will translate into market share and revenue. On the other hand, a seemingly inevitable issue that works against scale is the degraded quality of service (QoS) of an application. For large scale enterprises, it is a quick translation into downtime and revenue losses.

As services, i.e., application programming interfaces (APIs) become overloaded, they are unable to serve traffic with reasonable latency. In such a scenario, service-level monitoring involves grouping of functionally equivalent instances and tracking the service-level objectives (SLO). Again, referring to FIG. 1, for example, an inventory service can have SLO defined to have latency less than 20 milliseconds. When a group of servers on which an application runs is given more work than its resources support, it becomes slow. Application services take on work even when they're overloaded, but they become too slow to be useful.

Monitoring the health and performance of a networked microservices application is attained by having visibility into all the services, APIs, and databases that make up an application. The critical information that Site Reliability Engineers (SREs) and DevOps need to monitor is no longer the code inside a microservice, but instead is the interactions between various services making up an application. There is no innovative way to create user-defined labels into live traffic flow at the level of users, locations, JSON Web Tokens (JWTs), URIs, etc. for telemetry data gathering and leverage the same for flow control policy. These labels should be gathered from traffic flow and also from the code if available.

For many applications, the majority of the outages are caused by changes in a live system. When you change something in your service—you deploy a new version of your feature or change some code—there is always a chance for failure or the introduction of a new bug. No software or code is perfect. Slowness and/or bugs in upstream services can cause overloads in downstream services leading to cascading failures. To prevent this domino effect, modeling and limiting concurrency on each instance of a service is key. Referring to FIG. 1, a storefront user interface will depend on the inventory service in the backend.

The graceful handling of traffic spikes (e.g., holiday events such as Black Friday or travel booking for summer holidays, etc.) is a hard problem despite advanced capacity planning (e.g., the modeling demand and capacity is highly inaccurate). To scale microservices, there is an added level of complexity. While dealing with a single application or a load-balanced application, there might be elements of an application written in different programming languages, running on different infrastructure, running on different virtualization hypervisors, and deployed across one or more public clouds or on-premises. When demand increases for the application, all the underlying components must be coordinated to scale, or you must be able to identify which individual elements need to scale to address the surge in demand. When we think about auto-scaling microservices for an application, we are looking at improving on two major points:

Making sure the deployment can scale up fast in the case of a rapid load increase (so users don't face timeouts or HTTP 500s); and Lowering the cost of the infrastructure (i.e., keeping instances from being under-loaded).

For microservice-based applications deployed in remote edge locations, a heavy investment in reliability is needed, as the sites have hard capacity and bandwidth limits due to space constraints. These applications cannot depend on auto scaling and need the ability to do label based high performance distributed rate limiting and concurrency control.

Most enterprise applications have a system-wide toggle switch for enabling or disabling a new feature/experience for their end customers. A more complex implementation could have a toggle switch down to individual users/end customers or even based on actions performed by the user. A dynamic feature flag controller is needed, that maintains the service level objective of an application by refreshing feature toggles when an application is under heavy load. This helps in graceful degradation of a service without having to restart the overloaded application.

Lastly, there is no ability to apply flow control policies such as rate limiting, load shedding, auto scaling and many others on the "entirety" of an application architected from decoupled microservices. Thus, there is an inability to defend against the external abuse of a service and provide service protection for an application all within the same escalation recovery workflow. Currently, all of this is handled manually and in silos at the time-of-service overload. Incident response becomes harder as it becomes very difficult to identify blast radius and run an end-to-end recovery workflow. By way of example, automated scrapers and bot users unfairly consume precious bandwidth and push services to the brink. Hence an Aperture Controller is needed that can rapidly identify bot-like behavior and traffic to perform abuse prevention. At the same time, be ready to actuate other flow control policies defined by the user as part of the same workflow assuming SLO doesn't reach the desired set point.

This information is provided to reveal information believed by the applicant to be of relevance to the present invention. No admission is intended, nor should be construed, that any of the preceding information constitutes prior art.

Reliability is an expectation of trust that a system will remain available, whether it's an application, a distributed service, or a single server running in a data center. The more reliable a system is, the longer it can run before getting overloaded and requiring SREs to investigate the root cause. Disclosed herein are novel methods and systems to improve handling of API overload scenarios in networked microservices.

With the above information and problems in mind, certain embodiments of the present invention are related to methods and systems for on-demand collection of high-fidelity telemetry metrics and circuit-based signal processing models of policies, that can actuate concurrency control and apply distributed rate limit across networked microservices.

Accordingly, in one aspect, disclosed herein are computer-implemented platforms, systems, and methods for performing flow control as a service in a networked microservice-based application, the platforms, systems, and methods comprising and/or utilizing: an aperture controller comprising a circuit architecture configuration user interface and a policy control loop; and a plurality of aperture agents, each aperture agent comprising a metrics service, a flow classification service, and a flow control service; the circuit architecture configuration user interface configured to perform operations comprising providing a user interface allowing a user to configure one or more circuits comprising a flow control policy comprising one or more of fluxmeters, controllers, and actuators, connected via labeled signals; the policy control loop configured to run continuously and perform operations comprising: receiving metrics data and telemetry data for network traffic and infrastructure from the plurality of aperture agents; analyzing the metrics data and telemetry data to determine one or more flow control policies to actuate at one or more specific nodes; exporting the determination to the plurality of aperture agents; and policing violations of actuated flow control policies; the metrics service configured to perform operations comprising collecting metrics data and telemetry data for network traffic and infrastructure; the flow classification service configured to perform operations comprising: classifying the network traffic based on the metrics data, the telemetry data, and maintained network traffic classification rules; and tagging the network traffic based on the classification; and the flow control service configured to perform operations comprising: maintaining the network traffic classification rules; enforcing the one or more flow control policy determinations exported from the aperture controller; and injecting further information into network traffic. In various embodiments, the flow control policies comprise one or more of: rate limiting, load shedding, auto scaling, and traffic label quotas. In some embodiments, the metrics data and telemetry data for network traffic and infrastructure comprises traffic concurrency. In further embodiments, the flow control policies comprise concurrency limitation. In still further embodiments, the flow control policies comprise a quota for bot traffic. In some embodiments, the aperture agents are deployed per node of the application. In some embodiments, the metrics data and telemetry data for network traffic and infrastructure comprises user-agent.

In another aspect, disclosed herein are computer-implemented methods of performing flow control as a service in a networked microservice-based application, the method comprising the following steps: providing an aperture controller comprising: a circuit architecture configuration user interface configured to perform operations comprising providing a user interface allowing a user to configure one or more circuits comprising a flow control policy comprising one or more of fluxmeters, controllers, and actuators, connected via labeled signals; and a policy control loop configured to run continuously and perform operations comprising: receiving metrics data and telemetry data for network traffic and infrastructure from a plurality of aperture agents; analyzing the metrics data and telemetry data to determine one or more flow control policies to actuate at one or more specific nodes; exporting the determination to the plurality of aperture agents; and policing violations of actuated flow control policies; and deploying a plurality of aperture agents, each aperture agent comprising: a metrics service configured to perform operations comprising collecting metrics data and telemetry data for network traffic and infrastructure; a flow classification service configured to perform operations comprising: classifying the network traffic based on the metrics data, the telemetry data, and maintained network traffic classification rules; and tagging the network traffic based on the classification; and a flow control service configured to perform operations comprising: maintaining the network traffic classification rules; enforcing the one or more flow control policy determinations exported from the aperture controller; and injecting further information into network traffic. In various embodiments, the flow control policies comprise one or more of: rate limiting, load shedding, auto scaling, and traffic label quotas. In some embodiments, the flow control policies comprise concurrency limitation. In further embodiments, the flow control policies comprise a quota for bot traffic. In some embodiments, the aperture agents are deployed per node of the application. In some embodiments, the metrics data and telemetry data for network traffic and infrastructure comprises user-agent.

In yet another aspect, disclosed herein are computer-implemented methods of performing flow control as a service in a networked microservice-based application, the method comprising the following steps: providing a circuit architecture configuration user interface allowing a user to configure one or more circuits comprising a flow control policy comprising one or more of fluxmeters, controllers, and actuators, connected via labeled signals; continuously running, at a controller, a policy control loop configured to perform operations comprising: receiving metrics data and telemetry data for network traffic and infrastructure from the plurality of aperture agents; analyzing the metrics data and telemetry data to determine one or more flow control policies to actuate at one or more specific nodes; exporting the determination to the plurality of aperture agents; and policing violations of actuated flow control policies; and deploying a plurality of aperture agents, each aperture agent configured to perform operations comprising: collecting metrics data and telemetry data for network traffic and infrastructure; maintaining network traffic classification rules; classifying the network traffic based on the metrics data, the telemetry data, and the network traffic classification rules; tagging the network traffic based on the classification; enforcing the one or more flow control policy determinations exported from the aperture controller; and injecting further information into network traffic. In various embodiments, the flow control policies comprise one or more of: rate limiting, load shedding, auto scaling, and traffic label quotas. In some embodiments, the metrics data and telemetry data for network traffic and infrastructure comprises traffic concurrency. In further embodiments, the flow control policies comprise concurrency limitation. In still further embodiments, the flow control policies comprise a quota for bot traffic. In some embodiments, the aperture agents are deployed per node of the application. In some embodiments, the metrics data and telemetry data for network traffic and infrastructure comprises user-agent.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Certain Definitions

Figure 1:
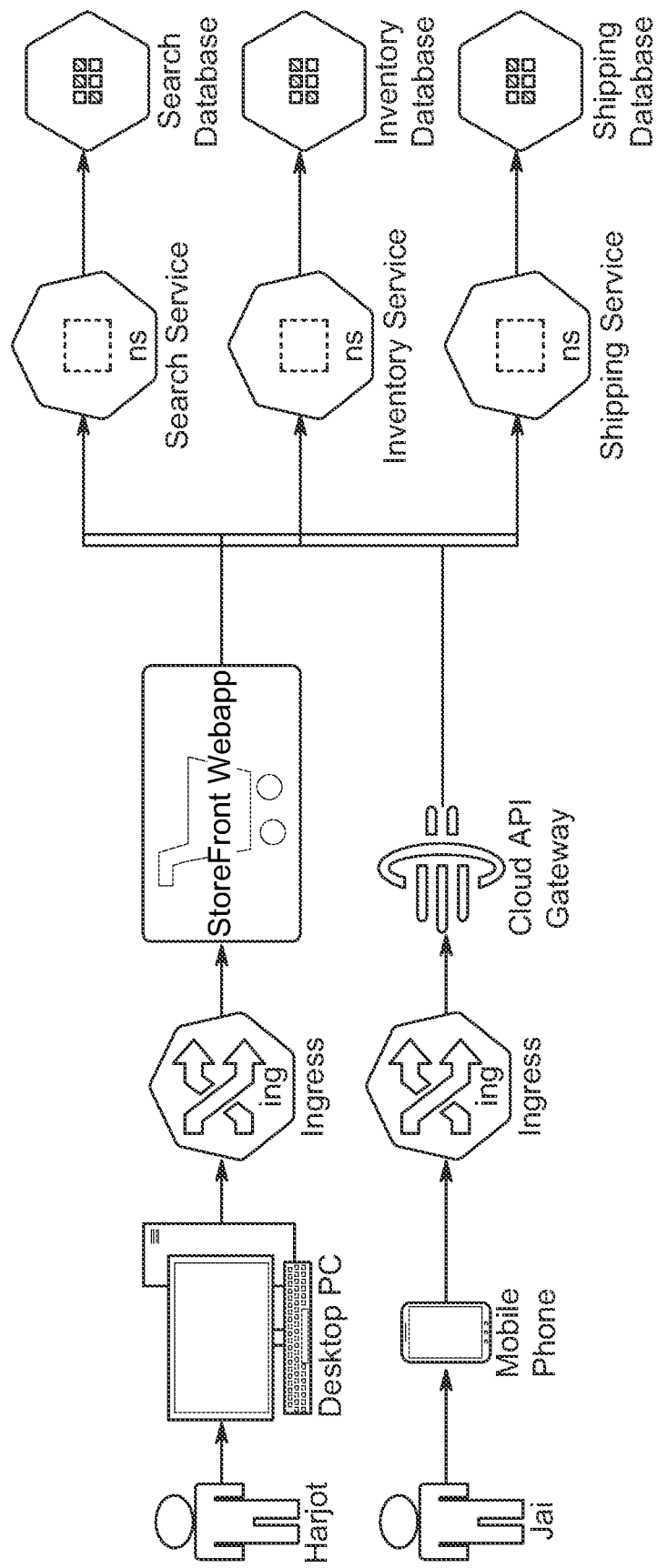
FIG. 1 is a multi-layered architecture of cloud-based microservices; for example, a fictitious e-commerce application.

Unless otherwise defined, all technical terms used herein have the same meaning as commonly understood by one of ordinary skills in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The term "Aperture Controller" is used herein. The Aperture Controller functions as the primary decision maker of the system. It detects issues with performance and facilitates the actuation of flow control policies when necessary. Leveraging our advanced control loop, the controller routinely analyzes polled metrics and indicators to determine how traffic should be shaped as defined by set policies. Once determined, these decisions are then exported to all agents to effectively handle overloaded workloads. Only one controller is needed to effectively manage each cluster.

The term "Aperture Agent" is used herein. The Aperture Agent is the decision executor. In addition to gathering data, the Aperture Agent functions as a gatekeeper, acting on traffic based on decisions made by the controller. Specifically, depending on feedback from the controller, the agent will effectively allow or drop incoming requests. Further supporting the controller, the agent works to inject information into traffic, including the specific traffic-shaping decisions made and classification labels, which can later be used in policing. One agent is deployed per node.

The term "Representational State Transfer" is used herein. The Representational State Transfer (REST) defines four interface constraints:
 identification of resources;
 manipulation of resources;
 self-descriptive messages; and
 hypermedia as the engine of application state.
Generally it describes a machine to machine interface and more specifically in web development it allows for an addition or replacement of server-side rendering to assist client-side rendering in web applications as client server model where the web browser acts as the client.

The term "JSON Web Token" is used herein. JSON Web Token (JWT) is a proposed Internet standard for creating data with optional signature and/or optional encryption whose payload holds JSON that asserts some number of claims. The tokens are signed either using a private secret or a public/private key.

The term "Uniform Resource Locator" is used herein. A Uniform Resource Locator (URL) is a unique identifier used to locate a resource on the Internet. It is also referred to as a web address. URLs consist of multiple parts—including a protocol and domain name—that tell a web browser how and where to retrieve a resource.

The term "Application Programming Interface" is used herein. An Application Programming Interface (API) is a way for two or more computer programs to communicate with each other. It is a type of software interface, offering a service to other pieces of software. A document or standard that describes how to build or use such a connection or interface is called an API specification. A computer system that meets this standard is said to implement or expose an API. The term API may refer either to the specification or to the implementation.

Described herein, in certain embodiments, are computer-implemented platforms and/or systems for performing flow control as a service in a networked microservice-based application, the system comprising: an aperture controller comprising a circuit architecture configuration user interface and a policy control loop; and a plurality of aperture agents, each aperture agent comprising a metrics service, a flow classification service, and a flow control service; the circuit architecture configuration user interface configured to perform operations comprising providing a user interface allowing a user to configure one or more circuits comprising a flow control policy comprising one or more of fluxmeters, controllers, and actuators, connected via labeled signals; the policy control loop configured to run continuously and perform operations comprising: receiving metrics data and telemetry data for network traffic and infrastructure from the plurality of aperture agents; analyzing the metrics data and telemetry data to determine one or more flow control policies to actuate at one or more specific nodes; exporting the determination to the plurality of aperture agents; and policing violations of actuated flow control policies; the metrics service configured to perform operations comprising collecting metrics data and telemetry data for network traffic and infrastructure; the flow classification service configured to perform operations comprising: classifying the network traffic based on the metrics data, the telemetry data, and maintained network traffic classification rules; and tagging the network traffic based on the classification; and the flow control service configured to perform operations comprising: maintaining the network traffic classification rules; enforcing the one or more flow control policy determinations exported from the aperture controller; and injecting further information into network traffic.

Also described herein, in certain embodiments, are computer-implemented methods of performing flow control as a service in a networked microservice-based application, the method comprising: providing an aperture controller comprising: a circuit architecture configuration user interface configured to perform operations comprising providing a user interface allowing a user to configure one or more circuits comprising a flow control policy comprising one or more of fluxmeters, controllers, and actuators, connected via labeled signals; and a policy control loop configured to run continuously and perform operations comprising: receiving metrics data and telemetry data for network traffic and infrastructure from a plurality of aperture agents; analyzing the metrics data and telemetry data to determine one or more flow control policies to actuate at one or more specific nodes; exporting the determination to the plurality of aperture agents; and policing violations of actuated flow control policies; and deploying a plurality of aperture agents, each aperture agent comprising: a metrics service configured to perform operations comprising collecting metrics data and telemetry data for network traffic and infrastructure; a flow classification service configured to perform operations comprising: classifying the network traffic based on the metrics data, the telemetry data, and maintained network traffic classification rules; and tagging the network traffic based on the classification; and a flow control service configured to perform operations comprising: maintaining the network traffic classification rules; enforcing the one or more flow control policy determinations exported from the aperture controller; and injecting further information into network traffic.

Also described herein, in certain embodiments, are computer-implemented methods of performing flow control as a service in a networked microservice-based application, the method comprising: providing a circuit architecture configuration user interface allowing a user to configure one or more circuits comprising a flow control policy comprising one or more of fluxmeters, controllers, and actuators, connected via labeled signals; continuously running, at a controller, a policy control loop configured to perform operations comprising: receiving metrics data and telemetry data for network traffic and infrastructure from the plurality of aperture agents; analyzing the metrics data and telemetry data to determine one or more flow control policies to actuate at one or more specific nodes; exporting the determination to the plurality of aperture agents; and policing violations of actuated flow control policies; and deploying a plurality of aperture agents, each aperture agent configured to perform operations comprising: collecting metrics data and telemetry data for network traffic and infrastructure; maintaining network traffic classification rules; classifying the network traffic based on the metrics data, the telemetry data, and the network traffic classification rules; tagging the network traffic based on the classification; enforcing the one or more flow control policy determinations exported from the aperture controller; and injecting further information into network traffic.

On-Demand Collection of High-Fidelity Telemetry for Control Loop Purposes

Classifying network traffic allows you to see what kinds of traffic you have, organize the various kinds of network traffic into labels, and treat some types of traffic differently than others. Identifying and organizing network traffic is the foundation for applying the appropriate QoS feature to that specific label, enabling you to allocate network resources to deliver optimal performance for different types of labels. For example, high-priority network traffic or traffic matching specific labels can be singled out for special handling, and thus, help to achieve peak application performance.

Figure 2:
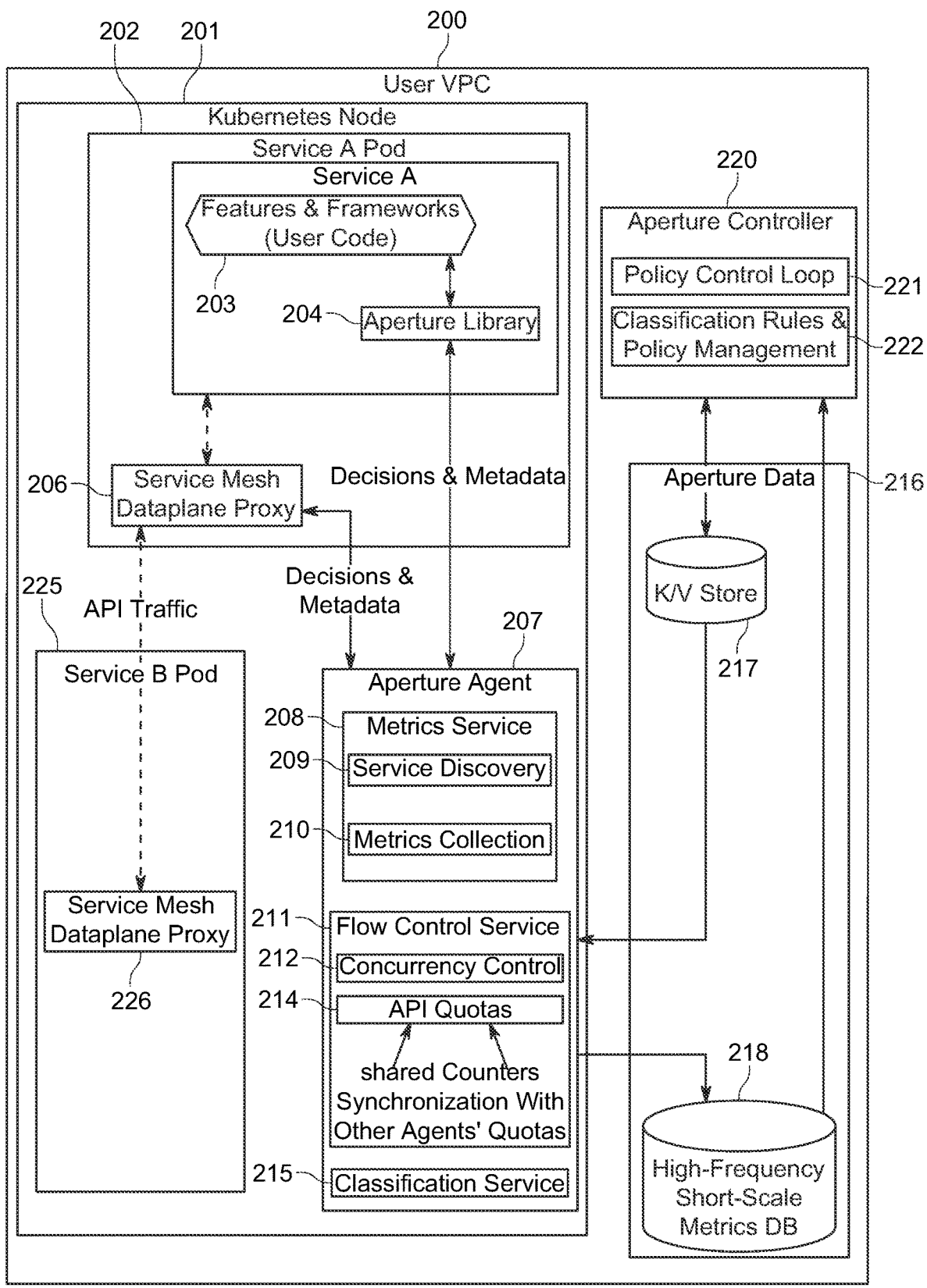
FIG. 2 is a schematic diagram of the platform architecture described herein.

FIG. 2 shows an non-limiting schematic diagram of an exemplary architecture for a platform, system, and application for performing flow control as a service in a networked microservice-based environment described herein. Continuing to refer to FIG. 2, in a particular embodiment, the platform is hosted on a user Virtual Private Cloud (VPC) 200. In the example of FIG. 2, the platform utilizes a container orchestration engine for automating deployment, scaling, and management of containerized applications such as, for example Kubernetes, and the platform comprises a Kubernetes Node 201, which comprises a Service A Pod 202, a Service B Pod 225, as well as the Aperture Agent 207, Aperture Controller 220, and associated Aperture Data 216.

In this example, Service A Pod 202 includes Service A comprising user code for Features/Frameworks 203 and an Aperture Library 204 and Service A Pod 202 further includes a Service Mesh Dataplane Proxy 206 in communication with Service A. Also in this example, Service B Pod 225 includes a Service Mesh Dataplane Proxy 226.

In the example of FIG. 2, the Service Mesh Dataplane Proxy 206 of Service A exchanges API Traffic data with the Service Mesh Dataplane Proxy 226 of Service B and the Service Mesh Dataplane Proxy 206 of Service and further exchanges Decisions and Metadata with the Aperture Agent 207. In the example of FIG. 2, the Aperture Library 204 of Service A also exchanges Decisions and Metadata with the Aperture Agent 207.

In this example, the Aperture Agent 207 comprises a Metrics Service 208 including Service Discovery 209 and Metrics Collection 210 functions, a Flow Control Service 211 including Concurrency Control 212 and API Quota 214 functions, as well as a Classification Service 215. The API Quotas 214 receive data, for example, from shared counters synchronized with other Agent's quotas. In the example of FIG. 2, the Aperture Agent 207 receives data from a K/V store 217 and generates high-frequency short-scale metrics, which are stored in a database 218.

Further in this example, the Aperture Controller 220 comprises a Policy Control Loop 221 and Classification Rules and Policy Management 222. In the example of FIG. 2, the Aperture Controller 220 receives high-frequency short-scale metrics from the database 218 and exchanges data with the K/V store 217.

As a first step to self-defense for a service overload scenario, it is best to apply a rate limit per user-defined label to the incoming traffic flows at specific control points. One of the foundational pieces that leads to flexible observability and control is the ability to dynamically identify flows at the level of users, locations, JWT tokens, URLs and so on by extracting fields of interest from HTTP requests. This capability also provides the ability to control the traffic (e.g., rate limit, concurrency control, etc.) based on classification key (s) in a prioritized manner. There are two ways to define a flow classification rule.

1) Using a declarative extractor. Suitable from simple cases, like pulling a value from header or a field from JSON body. Referring to Table 1 in a particular embodiment:

TABLE 1

```
default.classification.yaml: |
    # Example of Flow Classification rules file,
    showcasing using "extractors" and raw rego.
    selector:
        namespace: demoapp
        service: demo1-demo-app
        control point: { traffic: ingress }
    # An example rule using extractor.
    ua:
        extractor:
            from: request.http.headers.user-agent
```

2) Directly providing a Rego module. This capability, although being slightly more complex, allows the user to employ a full power of a Rego language (Rego language originated in Open Policy Agent to write access policies). Referring to Table 2, in a particular embodiment:

TABLE 2

```
default.classification.yaml: |
    selector:
        namespace: demoapp
        service: demo1-demo-app
        control point: { traffic: ingress }
labels:
    # The same rule using raw rego.
    Requires
    specifying rego source code and a query
    also-ua:
        rego:
            source: |
                package my.rego.pkg
                import input.attributes.request.http
                ua = http.headers["user-agent"]
            query: data.my.rego.pkg.na
    user:
        extractor:
            from: request. http headers.user
```

Tracing Baggage Embodiment

Figure 4:
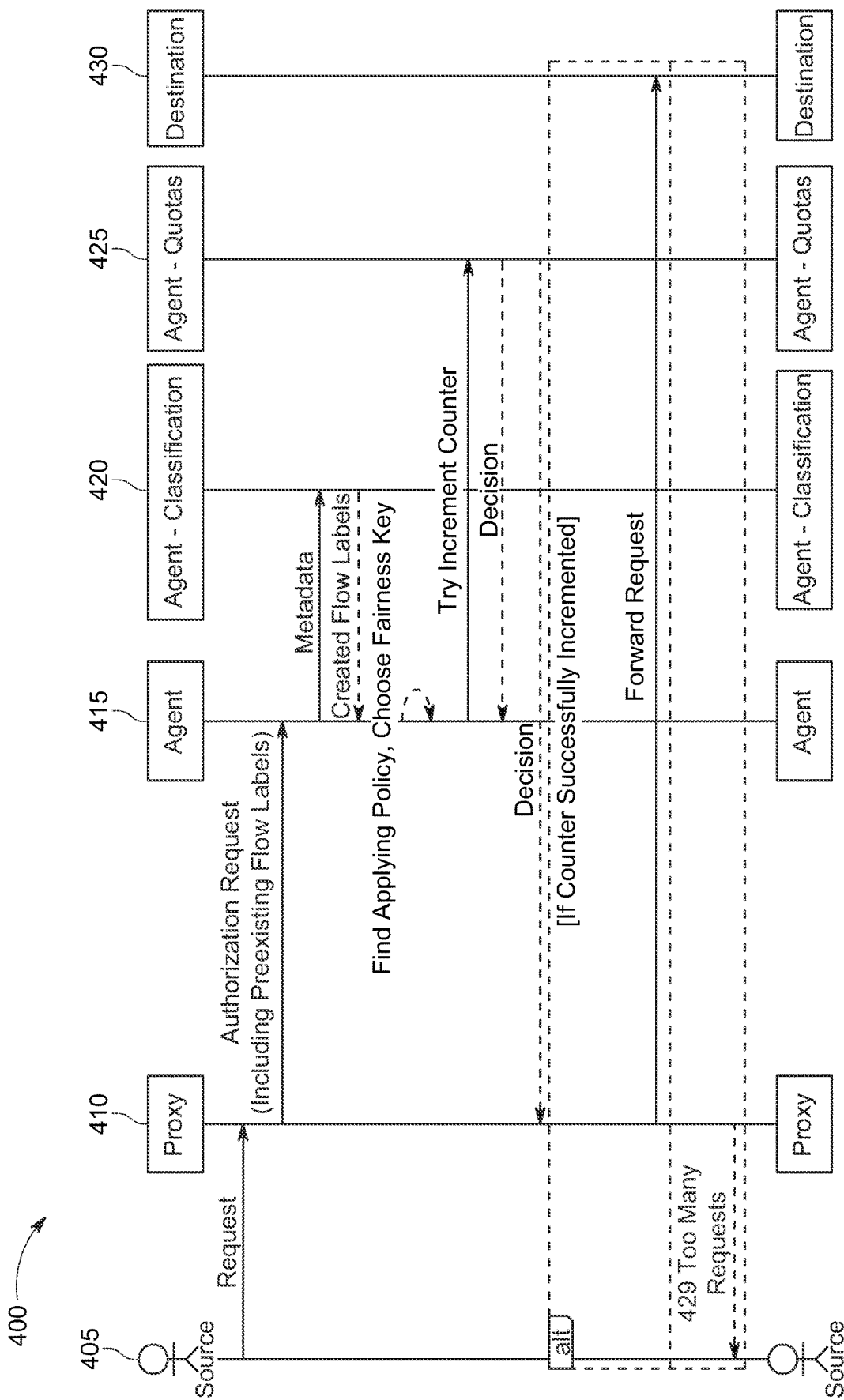
FIG. 4 is a flowchart of an exemplary sequence diagram of applying a rate limit policy.

Referring to FIG. 4, in a particular exemplary embodiment, Aperture is engineered to observe anything that is in a time-series database (for example, but not limited to, Prometheus). Most importantly the golden signals, which are truly necessary to monitor and maintain Service Level Objectives (SLO). As part of the classification step, the Aperture library also inserts tracing baggage headers to watermark the original flow and child flows (e.g., for each classification rule that is a match, we insert header in the API <flow_label_key:computed flow_label_value>). These classification headers are used for fine-grained observability into flows and flow control. Usage of baggage headers allow the flow labels to be propagated to all subsequent requests. As a solution, we have developed gathering telemetry per classified label and we use that to invoke flow control policies during the period of overload.

Trace metrics—Whenever the Aperture plugin or library is enabled, telemetry data is generated for all the API requests seen. This telemetry data may also contain additional fields that are extracted from the traffic (Flow Classification) but also gathered from the code, traces/spans or logs. These contain accurate results because they are not sampled. These traces are aggregated within the Aperture agent and power the dual-frequency pipeline.

High-cardinality, low-frequency metrics are sent to a cloud service for long term Quality of Experience (QoE) analytics and behavior modeling. We preserve all service metadata and flow labels, so arbitrary metrics may be created post-factum based on user-defined selector.

For purposes of control loop evaluation, metrics are also stored in low-cardinality, high-frequency local time series databases. Because of high-frequency, these metrics need to be predefined using fluxmeter mechanism, which creates metrics for trace events based on a selector. Selector includes the service, its control point and also optionally a set of flow labels.

Telemetry Embodiment

Telemetry is the instrumentation of systems (usually via monitoring agents) so that they can collect data on how specific systems are performing. Telemetry is the automated communication process from multiple data sources. For Aperture, the data sources used are relational and time-series databases (for example, but not limited to, Druid, Hasura, and Prometheus). Telemetry data is used to improve end customer experiences (dynamic feature flag toggle), application health, application quality, and application performance.

Once telemetry is in place, a system starts producing data which can be monitored. However, different teams within a company may use different tools, which has led to a proliferation of monitoring agents that must be included in a company's code base. If not included, one will have to re-instrument if they decide to use different or additional tools. The Open Telemetry project makes it possible to instrument applications in one go and send correlated metrics and traces to multiple monitoring solutions.

Open Tracing Embodiment

Aperture leverages recent advancements and standards for tracing (e.g., Open Tracing) for observability and control. Aperture provides plugins for popular traffic proxies and gateways, and libraries that work with popular languages and frameworks.

Control Loop Embodiment

The objective of control theory is to develop a model or algorithm governing the application of system inputs to drive the system to the desired state. To do this, a controller with the requisite corrective behavior is required. This controller monitors the controlled process variable (PV) and compares it with the reference or set point (SP). The difference between the actual and desired value of the process variable called the error signal or SP-PV error, is applied as feedback to generate a control action to bring the controlled process variable to the same value as the set point.

Circuit Based Signal Embodiment

Figure 5:
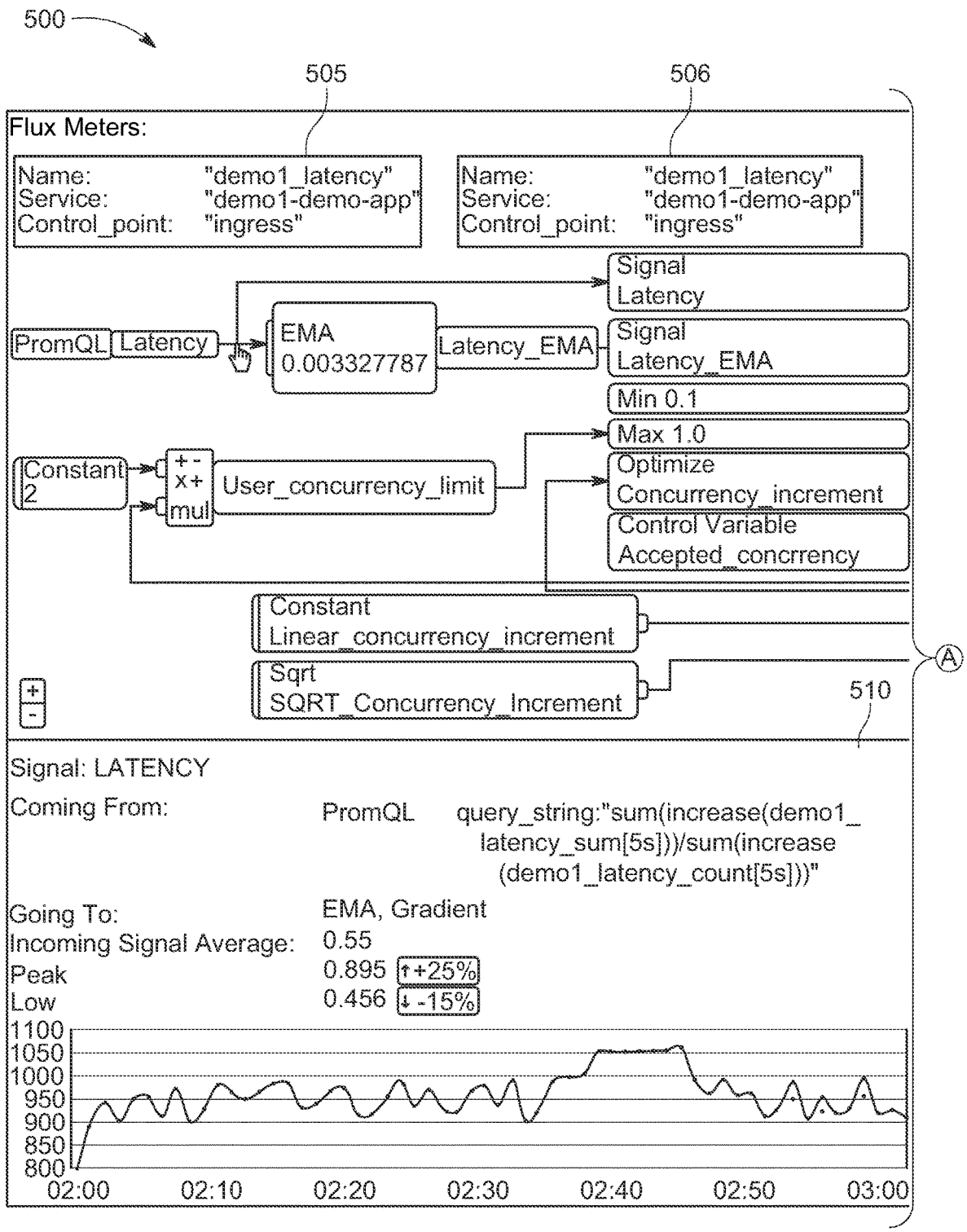
FIG. 5 is a mockup of an exemplary flow control policy in the user interface.
Figure 5:
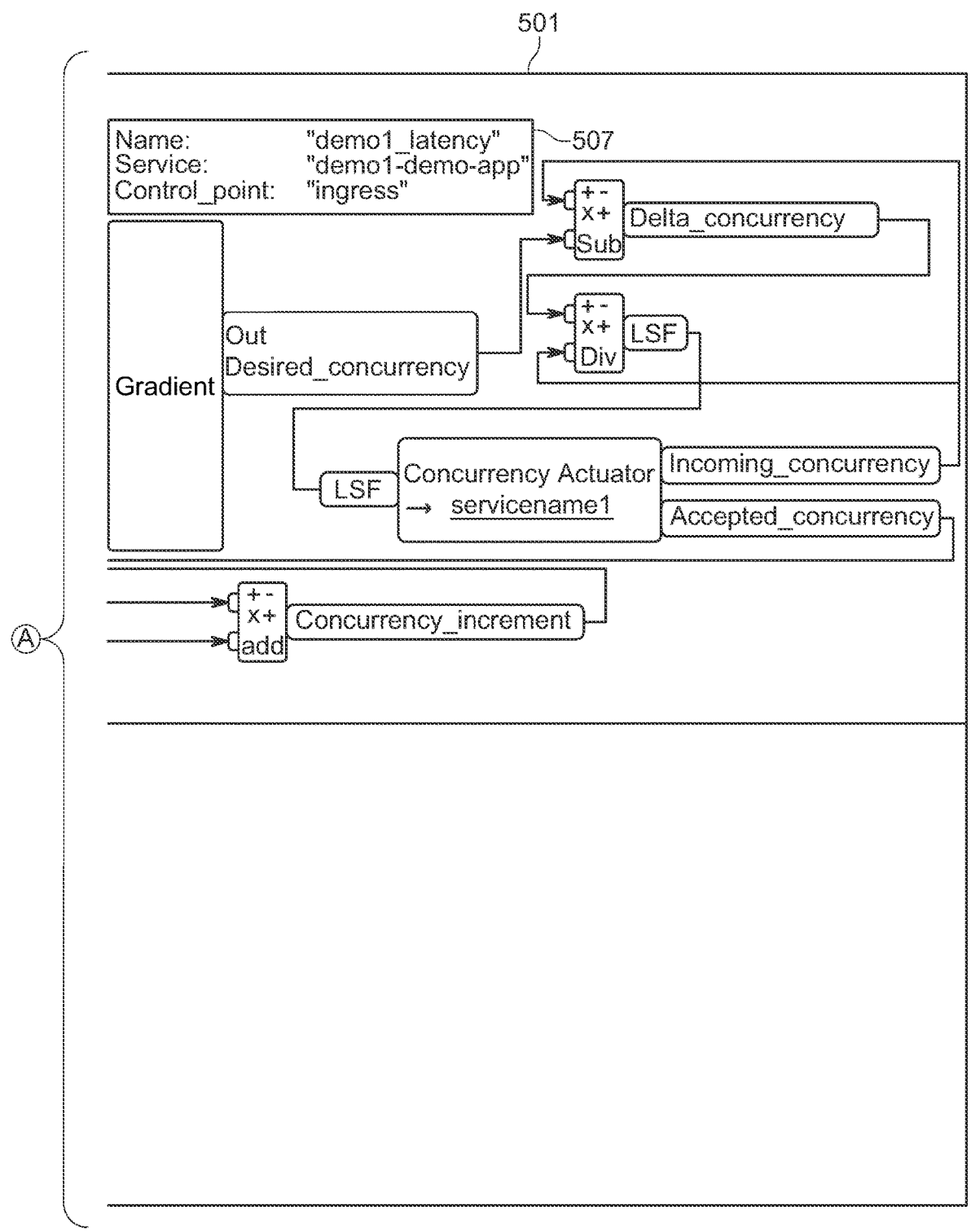

Referring to FIG. 5, in a particular exemplary embodiment, the flow control policy is defined as a circuit.

- Circuit defines a signal processing network as a list of components.
- Components are computational blocks that form the circuit.
- Signals flow into the components via input ports and results are emitted on output ports. Signals can be external (e.g., coming from fluxmeters via Prometheus) or internal (coming from other components).
- Components are wired to each other based on signal names forming an execution graph of the circuit.
- Loops are broken by the runtime at the earliest component index that is part of the loop. The looped signals are saved in the tick they are generated and served in the subsequent tick.

Execution of flow control policy can be separated into three areas: data collection, control loop itself, and actuation. The control loop itself runs on Aperture Controller, but the data collection and actuation need help from the components that the actual traffic is flowing through—namely proxies and libraries. These need to communicate through the Aperture Agent.

Figure 3:
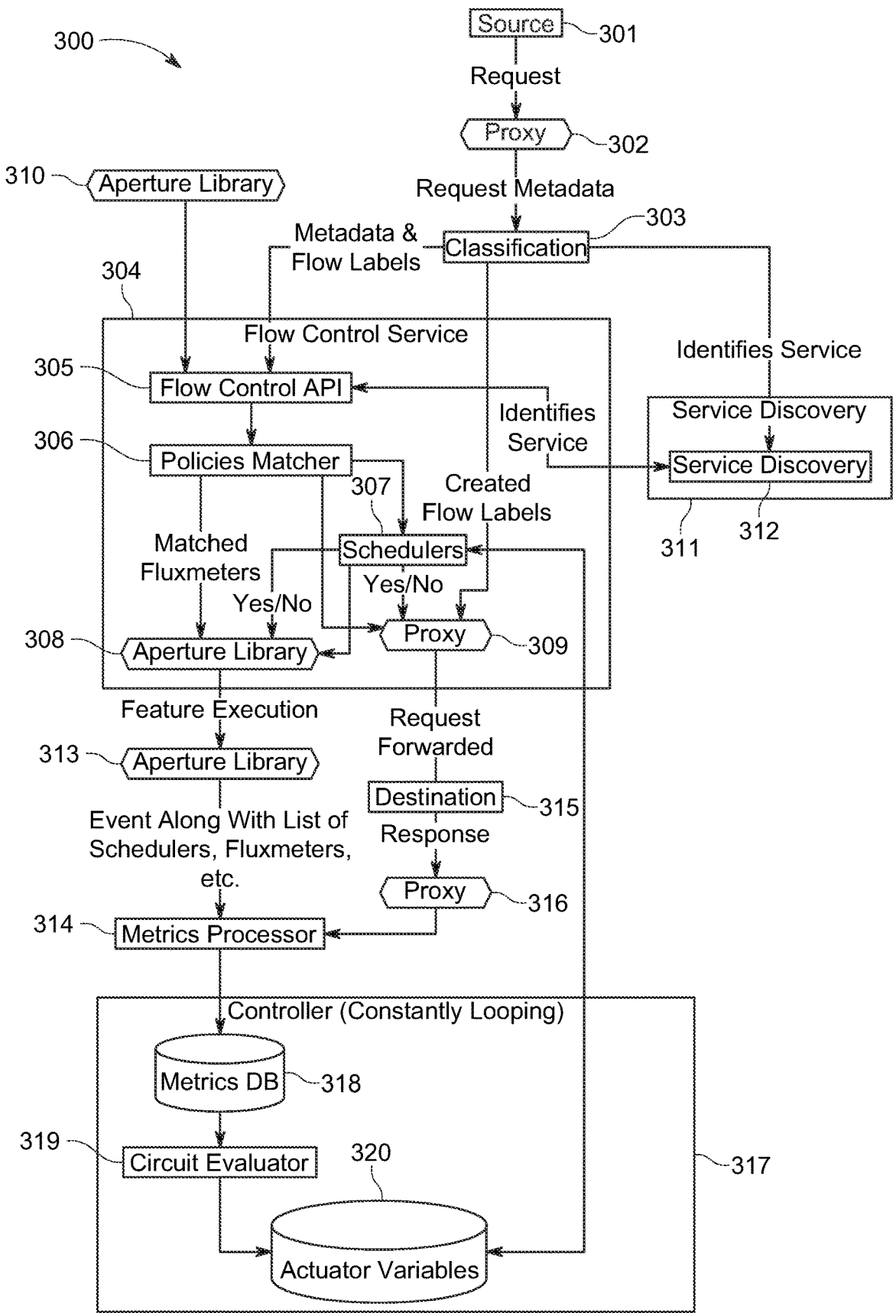
FIG. 3 is a schematic diagram of an exemplary flowchart.

FIG. 3 shows a non-limiting schematic diagram of a flowchart illustrating an exemplary process for performing flow control as a service in a networked microservice-based environment described herein. Continuing to refer to FIG. 3, in a particular embodiment, for every API request that occurs in the system, the Aperture plugin or library layer communicates with the Aperture Agent twice. The first call's main purpose is to check if the API request should be let through or not via schedulers (explained in more detail below). Additionally, in this step two auxiliary features are performed—execution of flow classification rules (described in more details above) and matching fluxmeters that apply to this request. Continuing to refer to FIG. 3, in this particular exemplary embodiment, the process 300 is initiated at a Source 301, which makes a request received at Proxy 302. Request metadata is then received at a Classification 303 module. The process 300 utilizes the functioning of at least a Flow Control Service 304, a Service Discovery 311,312 module, and a Controller 317, which is, in this example, constantly looping.

In the example of FIG. 3, the Flow Control Service 304 includes a Flow Control API 305 receiving data from a Aperture Library 310 and in communication with the Service Discovery 311,312 module to identify services. The Classification 303 module, communicates metadata and flow labels to the Flow Control API 305 and/or communicates created flow labels to a Proxy 309 of the Flow Control Service 304. The Flow Control API 305 also communicates with a Policies Matcher 306 module of the Flow Control Service 304, to communicate, by way of example, a current state of data transmission within the networked environment, which in turn interacts with a Aperture Library 308, Schedulers 307, and/or the Proxy 309, all within the Flow Control Service 304, with the Schedulers 307 communicating yes/no decisions to the Aperture Library 308 and/or the Proxy 309. In this example, the Aperture Library 308 of the Flow Control Service 304 sends extracted features to a further Aperture Library 313, which in turn sends the event, along with a list of schedulers, fluxmeters, and the like to a Metrics Processor 314. And, the Proxy 309 of the Flow Control Service 304 sends forwarded requests to the destination 315, which in turn sends a response to a further Proxy 316 and on to the Metrics Processor 314.

In the example of FIG. 3, the Controller 317 receives metrics from the Metrics Processor 314 at a Metrics database 318 and provides them to a Circuit Evaluator 319 to generate Actuator Variables 320, which are stored and fed back to the Schedulers 307 of the Flow Control Service 304.

The second point of communication between plugins/libraries is at the end of the request. At this point we know the full duration of a request and all its metadata, thus we can send a trace event for metrics processing. The important part of event metadata are the actuators and fluxmeters that were matched for this request. They will be used to create signals in the short-timescale-metrics database (Not Limiting to Prometheus) for the consumption of the control loop circuit. Note that trace reporting is not required to be real-time and can run in background/be batched within reasonable margin.

Actuator Embodiment

The process of actuation is split between two components. Actuator is firstly a component in the control loop circuit, which knows what's the desired Load Shed Factor (as calculated by the circuit). To perform the load shed, the actuator needs to actually drop some traffic. Because of this, actuator has also a second part running in Aperture Agent that handles the actual execution of flow control policy. The Controller's part of actuator communicates with the Agent's part via periodically updating a "decision message." The decision message could contain information such as what the current load shed factor for an agent, but it could also be more complex. Note that this channel of communication is directional—from Controller to Agents. The opposite direction of communication is realized via signals. This "decision message" is then used by the Scheduler. Every Agent has a copy of a Scheduler corresponding to an Actuator from a policy (multiple policies or multiple actuators in a policy could result in multiple schedulers). For every request, Agent executes every Scheduler that matches the request. Matching is based on selectors—each actuator is defined in policy to act on a specific part of a traffic—selector is defined as a service, control point and optionally set of flow labels.

Flow Control Policy Embodiment

Another embodiment of the invention, as shown and described by the various figures and accompanying text, provides a way to use any controller (gradient controller (AIMD, MIMD), PID controller, etc.) as part of the flow control policy circuit. There are actuators as part of our data-plane components in the flow control policy circuit that get installed using Selector that is based on infra or flow labels.

FIG. 5 shows a non-limiting exemplary flow control policy 501 in a user interface 500. Continuing to refer to FIG. 5, in a particular exemplary embodiment, using such a circuit model, we showcase an example policy 501 that protects the service trying to maintain latency objectives. There's a signal, latency 510, that pulls the measured request latency via the fluxmeter(s) 505,506,507. Note that the fluxmeter creates a histogram, but the signal is a scalar value. For the conversion, a query language (for example, but not limited to, Prometheus Query Language (PromQL)) could extract e.g., 95th percentile as a signal. This latency signal is then used to power the Gradient Controller. Note that the same signal is used as a signal and setpoint inputs to the Gradient Controller. The setpoint is routed via the Exponential Moving Average filter to achieve a result of "learning" the idle latency. One of other notable inputs to the Controller is the Control Variable—accepted concurrency in this case. Based on all the inputs, for every circuit evaluation tick, the gradient controller computes what's the desired concurrency that aims to bring the input signal to the setpoint. This is then subtracted from and divided by incoming concurrency (using "arithmetic" components), resulting in a Load Shed Factor signal, that's the input of the Concurrency Actuator. This circuit forms a simple policy that enables protection from traffic spikes and helps achieve service level objectives of maintaining latency.

The same circuit building blocks that constitute this policy could also be used to create more complex policies—they could use multiple input signals (e.g., combining multiple latency measurements or incorporating CPU and memory usage) and multiple controllers.

Concurrency Limiter Embodiment

Another embodiment of the invention, as shown and described by the various figures and accompanying text, provides a new innovative scheduler that operates on labels gathered from flows (traffic or code). This is a very different usage and implementation of Weighted Fair Queuing (WFQ) scheduler than what is seen in the network layer adopted by networking companies like Cisco, Arista, etc.

Scheduler's job is to shape the traffic (by blocking chosen requests) to fulfill the goal of the decision message (e.g., to achieve a certain load shed factor). Scheduler classifies a request as belonging to a workload and returns a decision whether request was accepted. Scheduler considers workload priorities, fairness, estimated weight of a request, and current load shed factor. Schedulers can accept or reject a request immediately or after some short period of time (on the order of milliseconds). If all matching schedulers accept a request, the request is considered accepted and such information is reported back to the Aperture plugin/library, which then can either pass the request forward or block it.

Token Embodiment

Little's law states that to compute the concurrency, we need to know the average number of requests per second, but also, the average latency. We assign each request a number of tokens, where the number of tokens is proportional to the processing time of a request. To calculate the concurrency precisely, we assign a request to a different workload, and for each workload, we estimate the expected number of tokens used by a request (auto tokens feature). The scheduler calculates available number of tokens per second, based on current concurrency and load shed factor, and then for each request it decides if the request may go through, based on number of estimated tokens, number of already used tokens and priority of a request. Each request has its timeout (configured per workload) in which it should be scheduled. If it's not scheduled within that timeout (because of lack of available tokens in the scheduler), it's considered dropped.

Distributed Rate Limiter Embodiment

Another embodiment of the invention, as shown and described by the various figures and accompanying text, provides a way to do high performance distributed rate limiting based on flow labels.

FIG. 4 shows an exemplary sequence diagram illustrating application of a rate limit policy 400. Continuing to refer to FIG. 4, in a particular exemplary embodiment, for protection from malicious users, bots, or limits imposed by external services, static quotas can be imposed on a service. Static quotas require a specified rate limit key, for which the quota will be counted. The extraction of the rate limit key can be powered by classification rules and can leverage baggage propagation to allow using labels created earlier in the request chain. Quota counters are implemented via a distributed counter, synced between agents. Continuing to refer to FIG. 4, in this exemplary embodiment, a source 405 generates a request, which is received by a proxy 410, and in turn generates an authorization request (including preexisting flow labels) and sends the authorization request to an agent 415. The agent 415 utilizes metadata to apply agent—classification 410 and optionally returns created flow labels. The agent 415, optionally finds and applies a policy and chooses a fairness key, then tries to increment a counter to apply agent—quotas 425 to optionally return a decision to the agent 415 or the proxy 410. Finally, if the counter is successfully incremented, the proxy 410 forwards the request to the destination 430, or alternatively refuses the request on the basis of too many requests, optionally alerting the source 405.

Note that the static quotas system can be thought as different kind of actuator and plugs into the policy-as-circuit model, which powers the quotas system with flexibility, e.g., precise limit could be a predefined constant, but could also be derived from some signals instead. Thanks to flow label matching, different quotas can also be applied to different kinds of traffic.

The rate limit value can be dynamic coming from the circuit to prevent abuse prevention. limit_key identifies the flows which are to be limited. Example, this key could be used. The counters are distributed and updated in real time. So, even small violations in limits are enforced via this mechanism. Customers can implement Rate Limits per user via this. An example, AWS limits API requests per API key per minute. This helps enforce limits in the application. Another example is rate limit escalation policy for bots and changing the rate limit dynamically: if service is overloaded for 2 min (Concurrency Limit Load Shed>50%), stop BoT traffic.

CAP Theorem Embodiment

Distributed rate limiter is designed mostly for speed rather than accuracy. In the CAP-theorem spectrum, we sacrifice consistency in favor of availability and partition tolerance. Rate limit counters are stored locally (in memory) on agents and are always available, counter synchronization may be running in "lazy mode." This compromise allows for the rate limit feature not to introduce additional latency, as compared to the central rate limit system. The cost of compromise here is the possibility that in some rare occurrences a few additional requests may get through, but that's a right compromise in order to prevent the bigger issues of abuse prevention of assigned quotas.

EXAMPLES

The following illustrative examples are representative of embodiments of the software applications, systems, and methods described herein and are not meant to be limiting in any way. When operating at web-scale, overloads are the leading cause of cascading failures in modern cloud applications. Provided herein are five use cases for the subject matter disclosed herein, which can cause overloads.

Example 1: Modern Web-Scale Applications are Vulnerable to Sudden Load

Several events may result in sudden overloads, including traffic spikes, viral application launches, and new deployments. In other words, revenue-generating user traffic may then translate into overloads that attack reliability and disrupt the user experience. Graceful application degradation then becomes critical to ensure service quality. By way of examples, the travel industry during the holiday season sees bookings spike, the retail industry sees spikes on Black Friday, finance vertical sees the spike during a marketing campaign for a product launch, etc.

Example 2: Peer Services Inadvertently Cause DoS

Diminished service quality may also result from failures in other applications. Slower request processing or bugs in upstream services can propagate effects into downstream services, leading to cascading failures. To prevent this domino effect, modeling and limiting concurrency on each instance of a service is key. For example, referring to FIG. 1, Storefront user interface will depend on the inventory service in the backend.

Example 3: Honoring Quota/Tenant Limits with Third Party Services

Throttling enabled by external services to manage speed or enforce varying subscription models may lead to timed-out transactions that cause a chain reaction. By way of example, services such as Twilio or cloud providers leverage such mechanisms at the cost of pesky errors seen by end-users. As such, the effective solution works backward from the third party hard-limits and adjusts application functionality.

Example 4: Failover is Often Messy

In another instance of the domino effect, when primary site(s) become unavailable, failover is pushed onto a backup, causing sudden congestion in this new location that may mean cascading failures. During the warming period, the backup site must see a graceful ramping-up of incoming traffic. By way of example, most of the disaster recovery (DR) sites do not have the same hardware resources as the primary site. So, when an application fails over to a DR site it cannot handle the same level of traffic as primary causing overload.

Example 5: Keeping Bots and User Abuse in Check

Another cause of sudden, difficult to predict overloads includes automated scrapers and bot users. Such dummy users unfairly consume precious bandwidth and push services to the brink, heavily driving up costs. Then, rapid identification of bot-like behavior and traffic scrubbing become key in minimizing such noise in distributed microservices. By way of example, websites nowadays allow web scrapers bots on their websites for data scraping purposes. Websites like Expedia look for the cheapest price across different airlines for tickets. During peak overload period rate limiting such scrappers would be to an advantage for an airline company and maintain SLO for their direct end customers.

After understanding these five factors that cause cascading failures in web-scale cloud applications, Aperture, the subject matter described herein, serves as the solution.

Example 6: Exemplary User Interface

Figure 6:
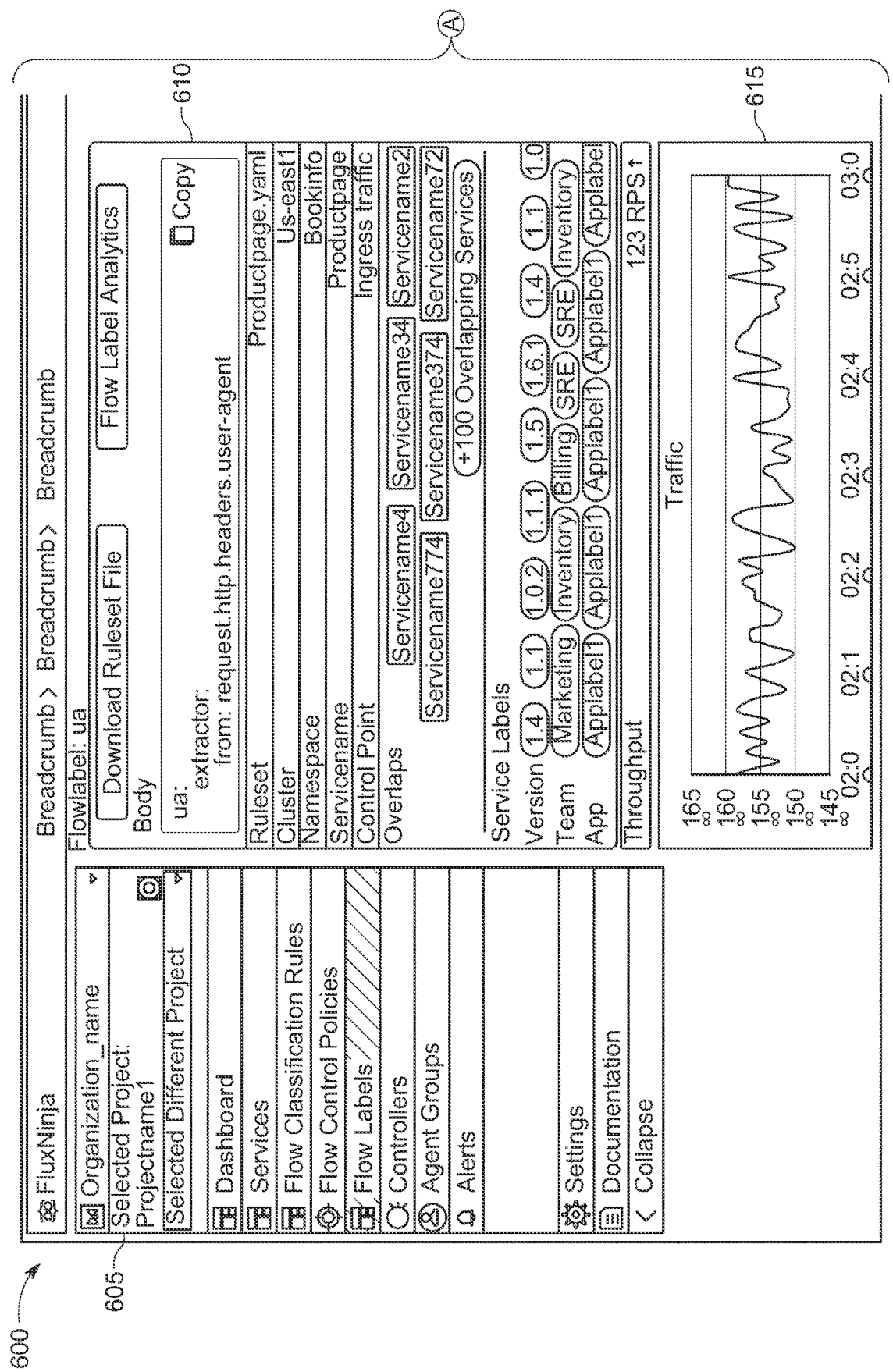
FIG. 6 is a mockup of exemplary flow classification rules in the user interface.
Figure 6:
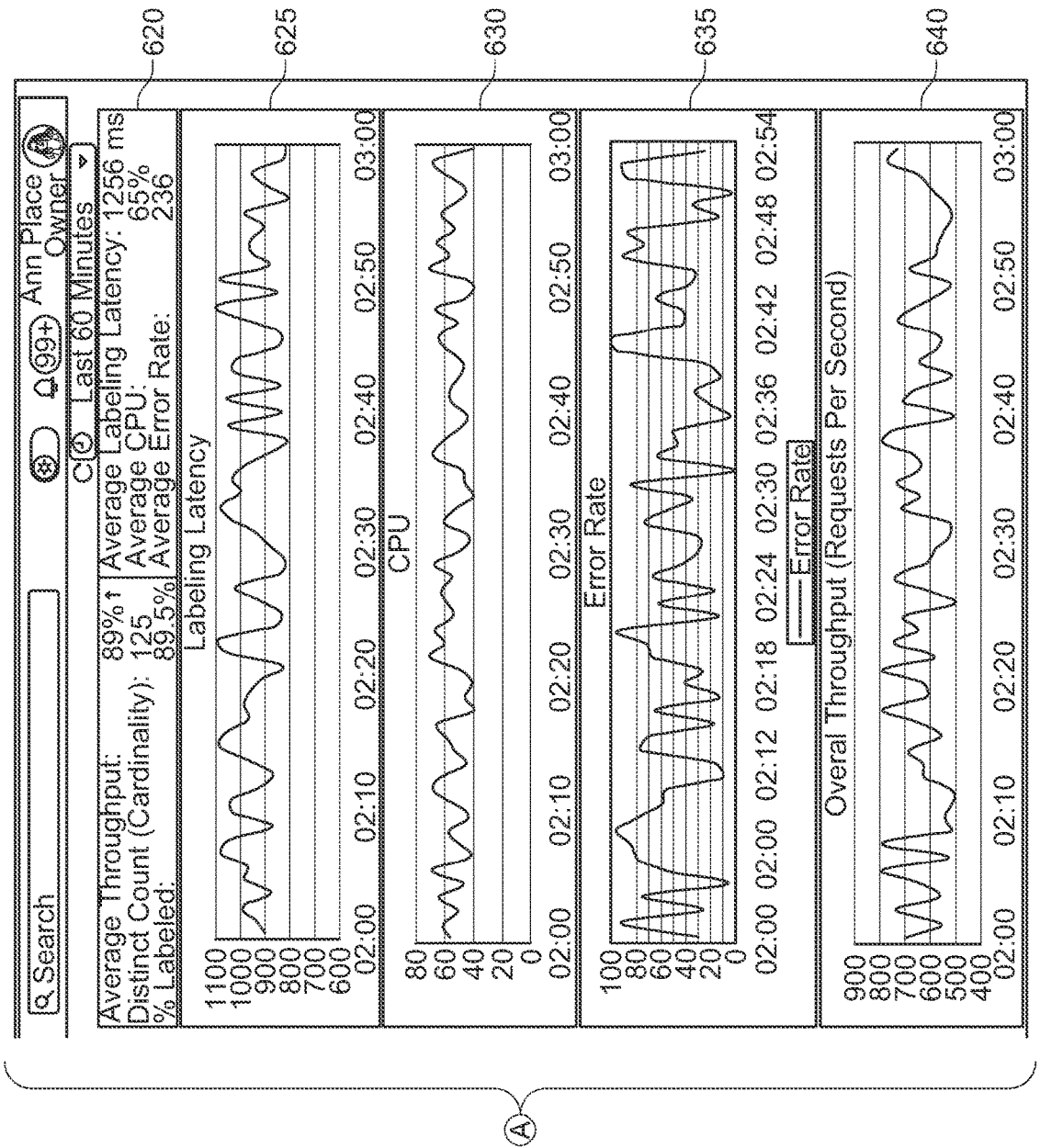

Referring to FIG. 6, in a particular embodiment, one or more user interfaces 600 are provided for the platforms, systems, applications, and methodologies described herein. In this example, a navigation panel 605 is provided to enable users to access a list of projects as well as the dashboard, services, flow classification rules, flow control policies, flow labels (currently shown in exemplary FIG. 6), controllers, agent groups, and alerts. Shown in FIG. 6 is an exemplary flow label and a panel 610 enabling user access to a ruleset file and flow label analytics. This panel 610 further provides information including, for example, flow label body, ruleset, cluster, namespace, service name, control point, overlaps, and service labels. The interface of FIG. 6 further provides a throughput readout and a traffic panel 615, showing traffic over time. Continuing to refer to FIG. 6, the interface also includes an overview panel 620 displaying, for example, average throughput, distinct count (cardinality), % labeled, average labeling latency, average CPU, and average error rate. Finally, in the example of FIG. 6, the interface still further includes breakout panels displaying, for example, labeling latency 625, CPU 630, error rate 635, and overall throughput (requests per second (RPS)) 640 over time.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented system for performing flow control as a service in a networked microservice-based application, the system comprising:
   a) an aperture controller comprising a circuit architecture configuration user interface and a policy control loop; and
   b) a plurality of aperture agents, each aperture agent comprising a metrics service, a flow classification service, and a flow control service;
   the circuit architecture configuration user interface configured to perform operations comprising providing a user interface allowing a user to configure one or more circuits comprising a flow control policy comprising one or more of fluxmeters, controllers, and actuators, connected via labeled signals;
   the policy control loop configured to run continuously and perform operations comprising:
   i) receiving metrics data and telemetry data for network traffic and infrastructure from the plurality of aperture agents;
   ii) analyzing the metrics data and telemetry data to determine one or more flow control policies to actuate at one or more specific nodes;
   iii) exporting the determination to the plurality of aperture agents; and
   iv) policing violations of actuated flow control policies;
   the metrics service configured to perform operations comprising collecting metrics data and telemetry data for network traffic and infrastructure;
   the flow classification service configured to perform operations comprising:
   i) classifying the network traffic based on the metrics data, the telemetry data, and maintained network traffic classification rules; and
   ii) tagging the network traffic based on the classification; and the flow control service configured to perform operations comprising:
  i) maintaining the network traffic classification rules;
  ii) enforcing the one or more flow control policy determinations exported from the aperture controller; and
  iii) injecting further information into network traffic.

2. The system of claim 1, wherein the flow control policies comprise one or more of: rate limiting, load shedding, auto scaling, and traffic label quotas.

3. The system of claim 1, wherein the metrics data and telemetry data for network traffic and infrastructure comprises traffic concurrency.

4. The system of claim 3, wherein the flow control policies comprise concurrency limitation.

5. The system of claim 4, wherein the flow control policies comprise a quota for bot traffic.

6. A computer-implemented method of performing flow control as a service in a networked microservice-based application, the method comprising:
  a) providing an aperture controller comprising:
    i) a circuit architecture configuration user interface configured to perform operations comprising providing a user interface allowing a user to configure one or more circuits comprising a flow control policy comprising one or more of fluxmeters, controllers, and actuators, connected via labeled signals; and
    ii) a policy control loop configured to run continuously and perform operations comprising:
      1) receiving metrics data and telemetry data for network traffic and infrastructure from a plurality of aperture agents;
      2) analyzing the metrics data and telemetry data to determine one or more flow control policies to actuate at one or more specific nodes;
      3) exporting the determination to the plurality of aperture agents; and
      4) policing violations of actuated flow control policies; and
  b) deploying a plurality of aperture agents, each aperture agent comprising:
    i) a metrics service configured to perform operations comprising collecting metrics data and telemetry data for network traffic and infrastructure;
    ii) a flow classification service configured to perform operations comprising:
      1) classifying the network traffic based on the metrics data, the telemetry data, and maintained network traffic classification rules; and
      2) tagging the network traffic based on the classification; and
    iii) a flow control service configured to perform operations comprising:
      1) maintaining the network traffic classification rules;
      2) enforcing the one or more flow control policy determinations exported from the aperture controller; and
      3) injecting further information into network traffic.

7. The method of claim 6, wherein the flow control policies comprise one or more of: rate limiting, load shedding, auto scaling, and traffic label quotas.

8. The method of claim 6, wherein the flow control policies comprise concurrency limitation.

9. The method of claim 8, wherein the flow control policies comprise a quota for bot traffic.

10. A computer-implemented method of performing flow control as a service in a networked microservice-based application, the method comprising:
  a) providing a circuit architecture configuration user interface allowing a user to configure one or more circuits comprising a flow control policy comprising one or more of fluxmeters, controllers, and actuators, connected via labeled signals;
  b) continuously running, at a controller, a policy control loop configured to perform operations comprising:
    i) receiving metrics data and telemetry data for network traffic and infrastructure from the plurality of aperture agents;
    ii) analyzing the metrics data and telemetry data to determine one or more flow control policies to actuate at one or more specific nodes;
    iii) exporting the determination to the plurality of aperture agents; and
    iv) policing violations of actuated flow control policies; and
  c) deploying a plurality of aperture agents, each aperture agent configured to perform operations comprising:
    i) collecting metrics data and telemetry data for network traffic and infrastructure;
    ii) maintaining network traffic classification rules;
    iii) classifying the network traffic based on the metrics data, the telemetry data, and the network traffic classification rules;
    iv) tagging the network traffic based on the classification;
    v) enforcing the one or more flow control policy determinations exported from the aperture controller; and
    vi) injecting further information into network traffic.

11. The method of claim 10, wherein the flow control policies comprise one or more of: rate limiting, load shedding, auto scaling, and traffic label quotas.

12. The method of claim 10, wherein the metrics data and telemetry data for network traffic and infrastructure comprises traffic concurrency.

13. The method of claim 12, wherein the flow control policies comprise concurrency limitation.

14. The method of claim 13, wherein the flow control policies comprise a quota for bot traffic.

* * * * *